Patented Oct. 18, 1927.

1,646,087

UNITED STATES PATENT OFFICE.

ROBERT FORSYTH, OF CHICAGO, ILLINOIS, ASSIGNOR, BY MESNE ASSIGNMENTS, TO HENRY J. RODGERS, RECEIVER.

PROCESS OF TREATING FIBROUS VEGETABLE MATERIAL.

No Drawing.   Application filed February 7, 1924. Serial No. 691,317.

The purpose of this invention is to provide an improved method or process of treating bast fibres such as flax, hemp, ramie and jute, and to render the fibre available for production of the highest quality of paper or textile for which said fibre is inherently adapted and to make available all of the by-products such as the gum and woody fibre of the several vegetable growths mentioned. It consists in the employment of the solvents and the steps of manipulation hereinafter mentioned and described, as set forth in the claims.

The process comprises the following steps and the use of the following materials.

The raw material,—that is to say, the flax, hemp, ramie or jute stalks or stems,— is first submitted to a bath of pure distilled water at a temperature of from 180° F. to 200° F. with preferably a small percentage of hydrochloric acid, not to exceed one per cent by weight. The raw product is kept in this hot bath for a period which may vary from one to three hours according to the condition of the stalk material, that is to say, if it is old and dry a longer time is required; and if it is fresh from the field the time may be much shorter for obtaining the same result. Second from this bath the stems or stalks are taken and passed through corrugated rolls to squeeze out the moisture and the dissolved and softened and plastic gum and resinous material. Third having been passed through this wringing process, the stalks are next immersed in a bath of distilled water at a temperature of approximately 200° F. containing substantially 10 per cent sodium carbonate, for a period of from 30 to 40 minutes. Fourth from this bath the stalks are again passed through corrugated rolls for wringing out the sodium carbonate solution and the material which it will have dissolved from the stalks. Fifth from this wringing the stalks are passed into a bath of distilled water at boiling temperature to rid it of all chemicals, this bath being continued until all chemicals have been substantially dissolved, this step being substantially a rinsing process which is followed —sixth— by passing the stalks again through suitable wringing rolls. After wringing from this hot rinsing bath, the material is placed in any suitable form of dryer, preferably of the endless belt type, where the moisture is driven off slowly, the temperature being preferably not to exceed 150° F. When properly dry the material is passed through a breaker for mechanically separating the woody substance from the fibre.

It may be understood that the purpose of employing corrugated wringing rolls in each of the wringing processes above described, is to render the fibre flexible without breaking it, and to mechanically detach or unseat the woody parts from the bast fibre.

One purpose of the process as a whole, which it will be observed causes no actual separation of the woody material from the fibre until after the drying, is to recover substantially all this woody fibre, which has all the value of the best wood fibre for making wood pulp and which constitutes substantially from 70 to 72 per cent of the weight of the stalks in all of these bast fibres mentioned. The fibre thus fully degummed and cleaned and separated from the wood can be bleached in any well known manner or may be employed unbleached if desired. Also at the first and second wringings the gum which is squeezed out and separated is recovered, and upon being cleansed in the well known manner constitutes a valuable by-product.

When the material obtainable for treatment is of a sort that has been "retted", that is, allowed to rot either on the ground or, as is sometimes done, under water, so that the woody portion is deteriorated beyond recovery in useful condition, it is first treated mechanically in a well known manner for clearing it of the rotten wood, and the fibre remnant is then treated according to first six steps above described; and after being wrung out from the boiling rinsing bath it is treated for bleaching in a well known manner; and from the final rinsing bath of the bleaching process the fibre is passed through corrugated wringing rolls, and thence to the dryer which completes this preparation ready for baling. Intermediate between each of the baths of the bleaching process, viz; bleaching, neutralizing and rinsing, the fibre, is passed through corrugated rolls for wringing out the liquid and furthering the softening or limbering of the fibre.

I claim:—

1. The herein described process of treating fibrous material which comprises subjecting the material to a hot bath comprising distilled water; squeezing out the softened gums and other solubles; subjecting the material to a second hot bath of distilled water containing a small percentage of sodium carbonate; squeezing out the matter dissolved in this second bath; subjecting the material to a rinsing bath in boiling distilled water to remove the chemicals; squeezing the rinsed material; drying the material slowly at a moderate temperature; and mechanically separating the woody portion from the bast fibres.

2. The herein described process of treating fibrous material which comprises subjecting the material to a hot bath comprising distilled water and a very small amount of hydrochloric acid; squeezing out the softened gums and other solubles; subjecting the material to a second hot bath of distilled water containing a small percentage of sodium carbonate; squeezing out the matter dissolved in this second bath; subjecting the material to a rinsing bath in boiling distilled water to remove the chemicals; squeezing the rinsed material; drying the material slowly at a moderate temperature; and mechanically separating the woody portion from the bast fibres.

3. The herein described process of treating fibrous material which comprises subjecting the material to a hot bath comprising distilled water; squeezing out the softened gums and other solubles; subjecting the material to a second hot bath of distilled water containing a small percentage of sodium carbonate; squeezing out the matter dissolved in this second bath; subjecting the material to a rinsing bath in boiling distilled water to remove the chemicals; squeezing the rinsed material; and drying the material slowly at a moderate temperature.

4. The herein described process of treating fibrous material which comprises subjecting the material to a hot bath comprising distilled water; squeezing out the softened gums and other solubles; subjecting the material to a second hot bath of distilled water containing a small percentage of sodium carbonate; squeezing out the matter dissolved in this second bath; subjecting the material to a rinsing bath in boiling distilled water to remove the chemicals; and squeezing the rinsed material.

5. The herein described process of treating fibrous material which comprises subjecting the material to a hot bath comprising distilled water and a very small amount of hydrochloric acid; squeezing out the softened gums and other solubles and simultaneously loosening the attachment of the woody portion from the bast fibres and rendering the fibres flexible while maintaining them whole; subjecting the material to a second hot bath of distilled water containing a small amount of sodium carbonate; squeezing out the matter dissolved in this second bath; and subjecting the material to a rinsing bath in boiling distilled water to remove the chemicals.

6. The hereindescribed process of treating fibrous material which comprises subjecting the material to a hot bath comprising distilled water and a very small amount of hydrochloric acid; squeezing out the softened gums and other solubles and simultaneously loosening the attachment of the woody portion from the bast fibres and rendering the fibres flexible while maintaining them whole; subjecting the material to a second hot bath of distilled water containing a small amount of sodium carbonate; squeezing out the matter dissolved in this second bath; subjecting the material to a rinsing bath in boiling distilled water to remove the chemicals; squeezing the rinsed material; and drying the material slowly at a moderate temperature.

7. The hereindescribed process of treating fibrous material which comprises subjecting the material to a hot bath comprising distilled water and a very small amount of hydrochloric acid; squeezing out the softened gums and other solubles and simultaneously loosening the attachment of the woody portion from the bast fibres and rendering the fibres flexible while maintaining them whole; subjecting the material to a second hot bath of distilled water containing a small amount of sodium carbonate; squeezing out the matter dissolved in this second bath; subjecting the material to a rinsing bath in the boiling distilled water to remove the chemicals; squeezing the rinsed material; drying the material slowly at a moderate temperature; and mechanically separating the woody portion from the bast fibre.

In testimony whereof, I have hereunto set my hand this 31 day of January, 1924.

ROBERT FORSYTH.